Sept. 22, 1925.

C. F. ADAMS 1,554,187

GAS VALVE INFLATION CLAMP

Filed Oct. 7, 1922

Inventor
Clarence F. Adams,
By Robert H. Young.
Attorney

Patented Sept. 22, 1925.

1,554,187

UNITED STATES PATENT OFFICE.

CLARENCE F. ADAMS, OF DAYTON, OHIO.

GAS-VALVE INFLATION CLAMP.

Application filed October 7, 1922. Serial No. 592,990.

*To all whom it may concern:*

Be it known that I, CLARENCE F. ADAMS, a citizen of the United States, residing at Dayton, in the county of Montgomery and State of Ohio, have invented certain new and useful Improvements in Gas-Valve Inflation Clamps, of which the following is a specification.

This invention relates to an improvement in the attachments of equipment for use in connection with the charging and discharging of gas containers under high or low pressure.

More particularly my invention contemplates the provision of a quick and easy attachment means suitable for connecting a high pressure gas cylinder valve to a manifold for releasing the gas into the manifold. Valves of the gas container may thus be attached without the use of a wrench or tool of any kind and this may be done much better and more quickly than by the old method of screwing on a nut with a wrench. Further objects will be more fully set forth in conjunction with the following description and claims.

Figure 2:
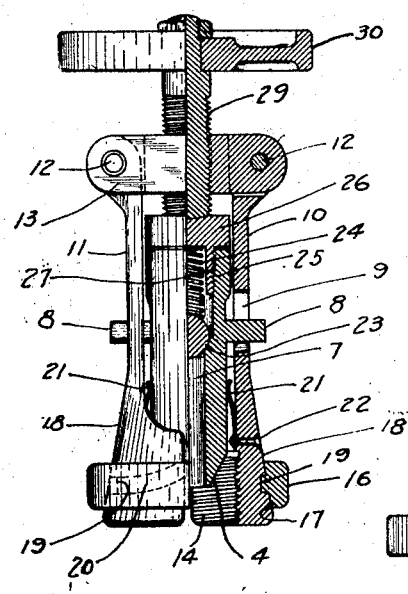
Fig. 2 is a front elevation of the clamp, half in section.
Figure 1:
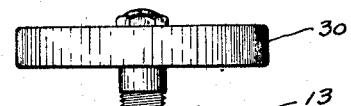
Fig. 1 is a side elevation of the clamp.
Figure 1:
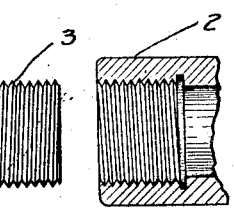
Figure 3:
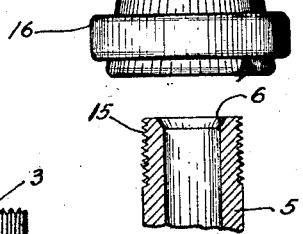
Fig. 3 is a side elevation showing the connection nipple which is to be connected to the manifold hose.
Figure 3:
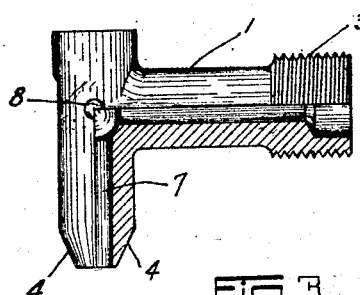

Numeral 1 indicates the connection nipple casting having external screw threads 3 at one end adapted to be connected to a suitable connection 2 provided on the hose leading from a manifold of any description. This main casting which is of a right-angular shape is provided at the opposite end with a bevelled edge 4 adapted to be connected to a gas valve such as is represented by the numeral 5, the end of which is provided with a frusto-conical face 6 which meets the end 4 of the main casting to provide a gas-tight joint. An internal passage 7 conducts the fluid or gas through the casting 1. Casting 1 is provided with two guide pins 8 movable in slots 9 in two hinged jaws 10 and 11. These jaws are pivoted at 12 to a head 13 and at the opposite end are provided with internal screw threads 14 adapted to connect with threads 15 on the gas valve 5. Surrounding the ends of jaws 10 and 11 is a circular taper collar 16 having frusto-conical inside face 17 which encloses the face 18 of the hinge jaws. Collar 16 is provided with two pins 19 which project inwardly and move in spiral cam groove 20 in the jaws 10 and 11. These cam grooves are so shaped that as the collar 16 is rotated the pins 19 will force the jaws tightly together. The jaws are pressed outwardly by springs 21 suitably riveted by rivets 22 to the jaws. 23 is a ball check provided with a spring 24. The upper end of the casting 1 is provided with internal screw threads 25, and the spring keeper and pressure plug 26 is provided with threads 27 and adapted to be screwed into the threads 25 to hold the ball check in place. Internal screw threads 28 are provided in the head 13 for engagement with threads on a stem 29. Stem 29 is rotated by hand wheel 30.

The operation of my device is as follows: The main casting 1 is connected to the manifold hose in any suitable manner. Taper collar 16 is rotated and slid upwardly on the locking jaws, springs 21 forcing these jaws outwardly. The threaded end of the gas valve is then inserted within the spread jaws and the collar is then moved down and rotated so as to force the jaws tightly together and securely hold the threads on the gas valve. The main casting is now moved downwardly within the jaws to provide a tight connection between the faces 4 and 6 on the casting and valve respectively. This is done by rotating the hand wheel 30 which presses down on the spring keeper 26, rigidly connected to the main casting, pins 8 meanwhile sliding within the slots in the locking jaws. Check valve illustrated in the drawing is used only for discharging cylinders to a plurality of tubes or attachments to the manifold. The check prevents a backing-up of gas through tubes not connected to cylinder valves. When the device is used in connection with charging gas cylinders, the check valve is dispensed with by removing the same from the main casting 1. It is evident that this may be easily done by the removal of the spring keeper 26.

The threads in the jaws may be either left or right-hand threads. For use in connection with gas cylinders for hydrogen, they may be left-handed and for all other gases will be right-handed, thus obviating all danger of connecting hydrogen cylinders to parts designed for other gases.

I claim:

1. In a device of the class described, a fitting adapted to be connected to a fluid conductor, means slidably mounted on said fitting for quickly attaching said fitting to a second fluid conductor, said means including a plurality of hinged jaws for grasping said second fluid conductor, a tapered contracting ring externally fitting said jaws for pressing said jaws against said second fluid conductor and hand operated means for pressing said fitting against the end of said second fluid conductor after the jaws have been tightened.

2. In a device of the class described, a right-angular fitting having a fluid conducting passage therethrough, means slidable upon said fitting for quickly attaching said fitting to a conductor, said means including a plurality of jaws for engaging said conductor, means for tightening said jaws against the conductor, and means for sliding said first-named means upon said fitting after the jaws have been tightened for pressing the end of said fitting against the end of the conductor.

3. An attachment device for fluid conductors comprising a fitting, means for securing said fitting to a fluid conductor comprising a plurality of hinged jaws mounted upon the fitting, said jaws being adapted to grasp said fluid conductor, a spiral groove in one of said jaws, a rotatable member provided with means for engaging said groove whereby as the member is rotated the jaws are pressed tightly against the fluid conductor.

4. An attachment device for fluid conductors comprising a fitting, means for securing said fitting to a fluid conductor comprising a plurality of hinged jaws slidably mounted upon the fitting, said jaws being provided with threads for engaging the threads on the fluid conductor, a groove in one of said jaws, a rotatable member provided with means for engaging said groove whereby as the member is rotated the threads on the jaws firmly engage the threads on the fluid conductor, and rotatable hand-operated means for pressing one end of said fitting firmly against the end of said fluid conductor.

5. An attachment device for fluid conductors comprising an angle fitting adapted to be connected to a fluid conductor and having a fluid conducting passage therein, a pair of projections on said fitting, a plurality of jaws adapted to embrace said fluid conductor and having slots for the reception of said projections, a hand operated member for tightening the jaws against the conductor and a hand operated member for urging said fitting toward said conductor after the jaws have been tightened for pressing the end of said fitting against the end of the conductor to form a fluid-tight joint.

6. An attachment device for fluid conductors comprising an angular fitting adapted to be connected to a fluid conductor and having a fluid conducting passage therethrough, a pair of projections on said fitting, a head piece, a plurality of jaws pivoted to said head piece having threaded ends adapted to embrace said fluid conductor, and having slots for the reception of said projections, a spring urging said jaws apart, a cam having a tapered opening for tightening the jaws against the conductor, and a hand wheel having threaded engagement with said head piece for moving said head piece away from said fitting after the jaws have been tightened, for pressing the end of said fitting against the end of said conductor.

In testimony whereof I affix my signature.

CLARENCE F. ADAMS.